United States Patent
Braho (10) Patent No.: US 12,456,462 B2
(45) Date of Patent: Oct. 28, 2025

(54) EXPECTED NEXT PROMPT TO REDUCE RESPONSE TIME FOR A VOICE SYSTEM

(71) Applicant: Hand Held Products, Inc., Charlotte, NC (US)

(72) Inventor: Keith P. Braho, Murrysville, PA (US)

(73) Assignee: Hand Held Products, Inc., Charlotte, NC (US)

( * ) Notice: Subject to any disclaimer, the term of this patent is extended or adjusted under 35 U.S.C. 154(b) by 282 days.

(21) Appl. No.: 18/056,525

(22) Filed: Nov. 17, 2022

(65) Prior Publication Data

US 2024/0169983 A1    May 23, 2024

(51) Int. Cl.
  *G10L 15/22*    (2006.01)
  *G10L 15/08*    (2006.01)

(52) U.S. Cl.
  CPC .............. *G10L 15/22* (2013.01); *G10L 15/08* (2013.01); *G10L 2015/225* (2013.01)

(58) Field of Classification Search
  CPC ... G10L 15/22; G10L 15/08; G10L 2015/225; G10L 13/04
  See application file for complete search history.

(56) References Cited

U.S. PATENT DOCUMENTS

| | | | |
|---|---|---|---|
| 8,909,538 B2 | 12/2014 | Kondziela | |
| 10,999,434 B1 * | 5/2021 | Andar | G06N 5/04 |
| 10,999,636 B1 * | 5/2021 | Kim | G10L 15/08 |
| 11,929,963 B1 * | 3/2024 | Zheng | G06F 8/77 |
| 2003/0236674 A1 * | 12/2003 | Henry, Jr. | G10L 19/00 704/500 |
| 2016/0005395 A1 * | 1/2016 | Williams | G06F 3/167 704/244 |
| 2016/0019434 A1 * | 1/2016 | Caldwell | G06V 10/462 345/474 |
| 2017/0113353 A1 * | 4/2017 | Monceaux | G10L 15/22 |
| 2017/0221486 A1 | 8/2017 | Kurata et al. | |
| 2018/0174020 A1 * | 6/2018 | Wu | G06N 3/044 |
| 2018/0329982 A1 * | 11/2018 | Patel | G06F 16/3322 |
| 2020/0273448 A1 | 8/2020 | Min et al. | |
| 2021/0081498 A1 * | 3/2021 | Goslin | G06F 18/285 |
| 2022/0230626 A1 * | 7/2022 | Duffy | G16H 50/20 |
| 2023/0125543 A1 * | 4/2023 | Santhar | G06F 16/345 704/260 |
| 2023/0173392 A1 * | 6/2023 | Kipnis | A63F 13/54 704/9 |
| 2024/0414135 A1 * | 12/2024 | Neumann | G16H 50/70 |

OTHER PUBLICATIONS

Extended European Search Report Mailed on Mar. 13, 2024 for EP Application No. 23207368, 8 page(s).

(Continued)

*Primary Examiner* — Darioush Agahi
(74) *Attorney, Agent, or Firm* — Alston & Bird LLP (57) ABSTRACT

Various embodiments described herein relate to generating and/or employing an expected next prompt to reduce response time for a voice system. In this regard, a candidate audio signal is generated for a predicted prompt to be presented via a user audio device. Additionally, in response to audio response data provided by the user audio device, the predicted prompt is compared to a prompt associated with the audio response data. In response to a determination that the predicted prompt matches the prompt, the candidate audio signal is presented via the user audio device.

12 Claims, 6 Drawing Sheets

(56) References Cited

OTHER PUBLICATIONS

Tim Paek et al., "Improving command and control speech recognition on mobile devices: using predictive user models for language modeling," User Modeling and User-Adapted Interaction, 17:93-117, (Jan. 18, 2007).

* cited by examiner

EXPECTED NEXT PROMPT TO REDUCE RESPONSE TIME FOR A VOICE SYSTEM

TECHNICAL FIELD

The present disclosure relates generally to voice technology systems, and more particularly to voice-guided workflows related to a voice technology system.

BACKGROUND

Mobile computing technology related to mobile devices, wearable devices, augmented realty devices, virtual reality devices, and/or other mobile computing technology are being increasingly employed in material handling environments, as well as other types of environments. Mobile computing technology can provide users with mobility while also providing the user with desirable computing, data collection, data processing functions, and/or data analytics. Such mobile computing technology also often provides a communication link to a server computer system. For example, mobile computing technology related to a warehouse system can provide a user with data associated with product distribution and tracking, product inventory management, etc. However, latency and/or other inefficiencies are often introduced between a mobile computing system and a server computer system. Additionally or alternatively, latency and/or other inefficiencies are often introduced by certain types of processing performed by a mobile computing system such as, for example, audio processing related to converting text to a speech signal.

BRIEF SUMMARY

In accordance with an embodiment of the present disclosure, a system comprises a processor and a memory. The memory stores executable instructions that, when executed by the processor, cause the processor to generate a candidate audio signal for a predicted prompt to be presented via a user audio device. In response to audio response data provided by the user audio device, the executable instructions, when executed by the processor, also cause the processor to compare the predicted prompt to a prompt associated with the audio response data. Additionally, in response to a determination that the predicted prompt matches the prompt, the executable instructions, when executed by the processor, also cause the processor to present audio associated with the candidate audio signal via the user audio device.

In accordance with another embodiment of the present disclosure, a method provides for generating a candidate audio signal for a predicted prompt to be presented via a user audio device. The method also provides for, in response to audio response data provided by the user audio device, comparing the predicted prompt to a prompt associated with the audio response data. The method also provides for, in response to a determination that the predicted prompt matches the prompt, presenting audio associated with the candidate audio signal via the user audio device.

In accordance with yet another embodiment of the present disclosure, a computer program product is provided. The computer program product comprises at least one computer-readable storage medium having program instructions embodied thereon, the program instructions executable by a processor to cause the processor to generate a candidate audio signal for a predicted prompt to be presented via a user audio device. In response to audio response data provided by the user audio device, the program instructions are also executable by the processor to cause the processor to compare the predicted prompt to a prompt associated with the audio response data. In response to a determination that the predicted prompt matches the prompt, the program instructions are also executable by the processor to cause the processor to present audio associated with the candidate audio signal via the user audio device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Mobile computing technology related to mobile device, wearable devices, augmented realty devices, virtual reality devices, and/or other mobile computing technology are being increasingly employed in material handling environments, as well as other environments related to manufacturing, factories, production, warehouses, distribution centers, shipping centers, access control, transportation and logistics, etc. Mobile computing technology can provide users with mobility while also providing the user with desirable computing, data collection, data processing functions, and/or data analytics. Such mobile computing technology also often provides a communication link to a server computer system. For example, mobile computing technology related to a warehouse execution system (WES), a warehouse management system (WMS), a warehouse control system (WCS), and/or another type of warehouse system can provide a user with data associated with product distribution and tracking, product inventory management, etc. However, latency and/or other inefficiencies are often introduced between a mobile computing system and a server computer system. Additionally or alternatively, latency and/or other inefficiencies are often introduced by certain types of processing performed by a mobile computing system such as, for example, audio processing related to workflow tasks.

Moreover, certain types of mobile computing technology employ a voice system to facilitate workflow tasks for a user. For example, a WES associated with warehouse workflow execution can employ a voice system to provide a user with data associated with warehouse workflows and/or other workflow tasks. However, a response time of a voice system may be longer than desired, which can lead to inefficient productivity for workers and/or related mobile computing systems. For example, an amount of time for a system to generate or obtain a signal to prompt a user may be longer than desired, leading to a slow response time of the system and/or inefficient worker productivity. Additionally or alternatively, excessive delay in generating a spoken response in a voice system on a mobile computing device can lead to inefficiencies for the productivity of the user and/or undesirable performance related to the voice system. Execution of a voice-based workflow generally consists of alternating series of prompts from a voice system and responses from users, where the content of each prompt depends upon the last response received from the user. Once a prompt is determined, the text data corresponding to the prompt can be converted into a digital audio signal. For example, text data corresponding to the prompt can be converted into a digital audio signal by a text-to-speech process. A typical text-to-speech process may take approximately 500 milliseconds to generate a digital audio signal and/or transmit the digital audio signal to an audio system to present the digital audio signal of the prompt to a user. During that time, the user may be waiting for the system and/or may be unable to make progress on his/her task. Moreover, a next prompt provided to a mobile computing system often depends on content of the response by the user. It is therefore desirable to reduce response time of a voice system during conversion of text to speech.

Thus, to address these and/or other issues, various embodiments disclosed herein provide for generating and/or employing an expected next prompt for a voice system. By generating and/or employing an expected next prompt, the response time of a voice system can be reduced. For example, text-to-speech latency can be reduced by generating and/or employing an expected next prompt for a voice system. In various embodiments, system latency is improved by employing signal caching and/or waveform caching of a sequence of one or more next prompts for a voice-based workflow. The one or more expected next prompts can be specified and/or predefined by a voice system. Additionally or alternatively, the one or more expected next prompts can be determined automatically by the voice system based on historical data related to prompts. For example, a voice dialog (e.g., a pre-stored voice dialog) can be configured to contain a first prompt (e.g., a check digit prompt) that asks a user to speak a check digits value for a particular location in a material handling environment and/or to listen for a check digit response or any of a number of other responses to that prompt, such as "repeat location", "item description", or "skip slot". The voice dialog can also be configured to deliver different prompts depending on content of audio provided by the user. Furthermore, the voice dialog can be configured with an expected next prompt, based on a most likely response that the user and/or related system is expected to say. Continuing with the above example, the user is most likely to say the correct check digit. Accordingly, the voice dialog can be configured with the expected next prompt to be spoken in response to the user speaking and a voice system recognizer recognizing the correct check digit. This may be a second prompt that tells the user how many items to pick up from the particular location in the material handling environment, etc. In various embodiments, the voice dialog can store definitions of one or more expected next prompts in order to provide respective pre-generated audio signals of the one or more expected next prompts. In various embodiments, the voice system recognizer can recognize a user response and/or the voice system can determine a next prompt in light of the user response. The voice system can compare the next prompt to the expected next prompt to determine whether or not to output the expected next prompt. Additionally, in various embodiments, data for the pre-generated audio signals can be stored in a cache memory of a mobile computing system for future reference.

In various embodiments, a next voice prompt to be provided to a user can be configured based on one or more expected responses of the user. Additionally, upon receiving an actual response from the user via a user audio device, the expected response can be compared to the actual response to determine whether to present the corresponding pre-generated audio signal via the user audio device or to discard the corresponding pre-generated audio signal. In response to a determination that the expected response matches the actual response, the pre-generated audio signal for the determined next voice prompt can be provided to the user audio device such that the user audio device can output the pre-generated audio signal via one or more speakers of the user audio device. The pre-generated audio signal can be output via speakers, a wired headset, wireless headset, wireless earbuds, or another type of audio output. However, in response to a determination that the expected response does not match the actual response, the determined next prompt and/or the corresponding pre-generated audio signal can be discarded. A text-to-speech process can then be initiated to generate the audio signal for the actual next prompt.

In various embodiments, multiple follow-up voice prompts can be predicted based on an expected response of a user. Additionally, multiple pre-generated audio signals for the multiple follow-up voice prompts can be generated. Based on an actual response of the user, a prompt from the multiple follow-up voice prompts can be selected and audio associated with a corresponding pre-generated audio signal of the selected voice prompt can be presented via the user audio device. In various embodiments, in response to presenting the audio associated with the corresponding pre-generated audio signal via the user audio device, pre-generated audio signals for one or more other voice prompts from the multiple follow-up voice prompts can be discarded.

In various embodiments, prior to receiving a response from a user, pre-generated audio signals for a list of one or more next voice prompts can be generated. Further, upon receiving the response from the user, speech of the user can be recognized and based on the recognized speech of the user, a voice prompt from the list of one or more next voice prompts can be selected. A pre-generated audio signal of the selected next voice prompt can also be presented via a user audio device associated with the user. Additionally, in response to presenting the audio associated with the pre-generated audio signal of the selected next voice prompt via the user audio device, one or more other pre-generated audio signals of one or more other voice prompts in the list of one or more next voice prompts can be discarded.

Figure 1:
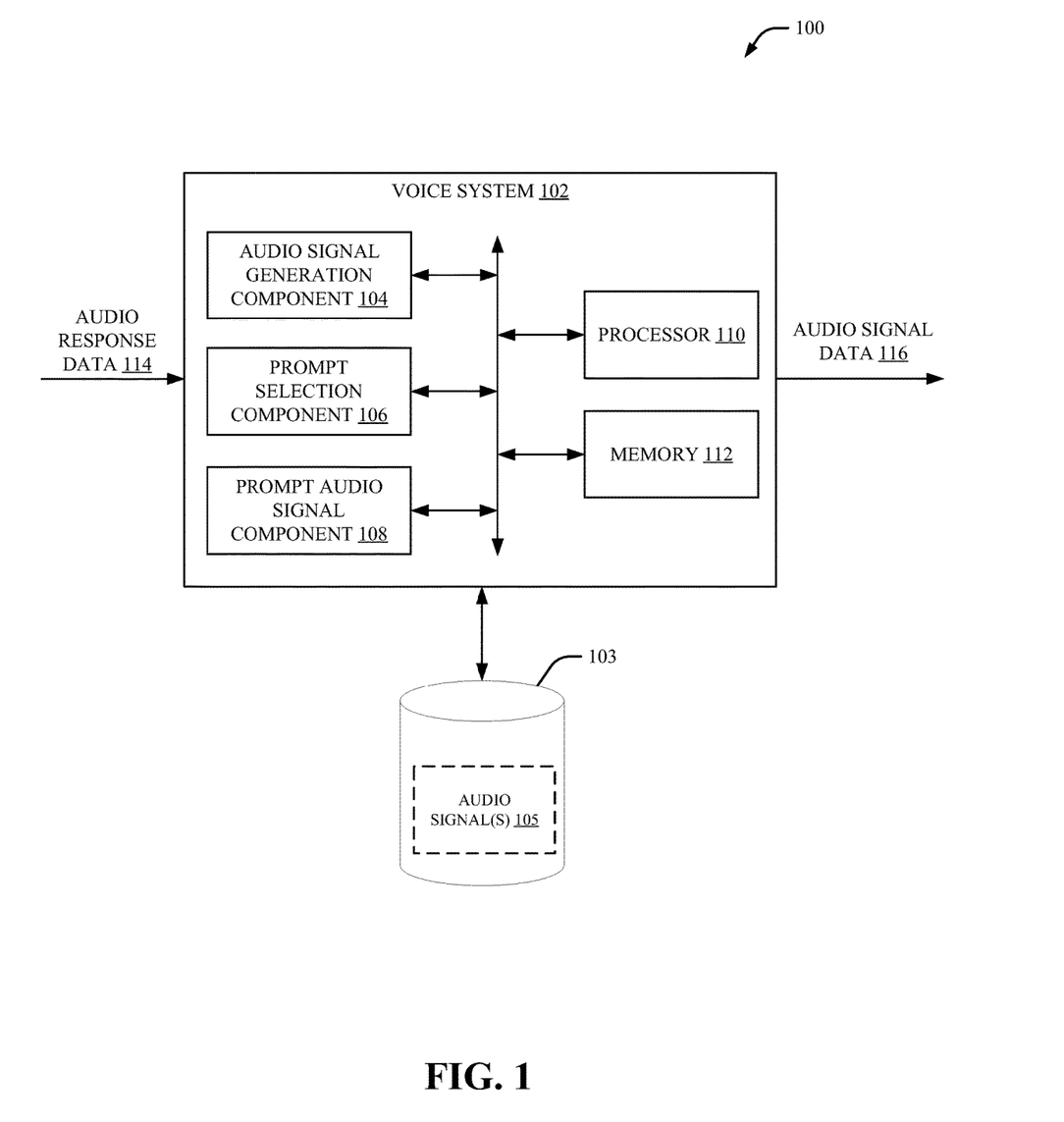
FIG. 1 illustrates an exemplary system for generating and/or employing an expected next prompt to reduce response time for a voice system, in accordance with one or more embodiments described herein.

FIG. 1 illustrates an exemplary embodiment of a system 100 within which one or more described features of one or more embodiments of the disclosure can be implemented. The system 100 includes a voice system 102 and a data repository 103. In one or more embodiments, the voice system 102 can be configured for audio processing related to one or more workflow tasks. For example, the voice system 102 can be configured to provide one or more user audio devices with data associated with warehouse workflows and/or other workflow tasks. In various embodiments, the voice system 102 can interface with or can be implemented on one or more voice-directed mobile terminals associated with one or more user audio devices to provide data associated with warehouse workflows and/or other workflow tasks. In certain embodiments, a workflow task can provide information related to one or more products or other items handled in a voice-directed work environment. In one or more embodiments, the voice system 102 can be associated with a WES, WMS, WCS, and/or another type of warehouse system associated with warehouse workflows, product distribution and tracking, product inventory management, etc.

The voice system 102 includes an audio signal generation component 104, a prompt selection component 106 and/or a prompt audio signal component 108. Additionally, in certain embodiments, the voice system 102 can include a processor 110 and/or a memory 112. In certain embodiments, one or more aspects of the voice system 102 (and/or other systems, apparatuses and/or processes disclosed herein) can constitute executable instructions embodied within a computer-readable storage medium (e.g., the memory 112). For instance, in an embodiment, the memory 112 can store computer executable component and/or executable instructions (e.g., program instructions). Furthermore, the processor 110 can facilitate execution of the computer executable components and/or the executable instructions (e.g., the program instructions). In an example embodiment, the processor 110 can be configured to execute instructions stored in the memory 112 or otherwise accessible to the processor 110.

The processor 110 can be a hardware entity (e.g., physically embodied in circuitry) capable of performing operations according to one or more embodiments of the disclosure. Alternatively, in an embodiment where the processor 110 is embodied as an executor of software instructions, the software instructions can configure the processor 110 to perform one or more algorithms and/or operations described herein in response to the software instructions being executed. In an embodiment, the processor 110 can be a single core processor, a multi-core processor, multiple processors internal to the voice system 102, a remote processor (e.g., a processor implemented on a server), and/or a virtual machine. In certain embodiments, the processor 110 can be in communication with the memory 112, the audio signal generation component 104, the prompt selection component 106 and/or the prompt audio signal component 108 via a bus to, for example, facilitate transmission of data among the processor 110, the memory 112, the audio signal generation component 104, the prompt selection component 106 and/or the prompt audio signal component 108. The processor 110 can be embodied in a number of different ways and can, in certain embodiments, include one or more processing devices configured to perform independently. Additionally, or alternatively, the processor 110 can include one or more processors configured in tandem via a bus to enable independent execution of instructions, pipelining of data, and/or multi-thread execution of instructions. The memory 112 can be non-transitory and can include, for example, one or more volatile memories and/or one or more non-volatile memories. In other words, for example, the memory 112 can be an electronic storage device (e.g., a computer-readable storage medium). The memory 112 can be configured to store information, data, content, one or more applications, one or more instructions, or the like, to enable the voice system 102 to carry out various functions in accordance with one or more embodiments disclosed herein. As used herein in this disclosure, the term "component," "system," "device," and the like, can be and/or can include a computer-related entity. For instance, "a component," "a system," "a device," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The audio signal generation component 104 can generate one or more audio signals for a set of audio signals 105 stored in the data repository 103. In one or more embodiments, the one or more signals can be related to one or more audio waveforms. In various embodiments, the data repository 103 is configured for caching of one or more audio signals (e.g., a sequence of audio signals) for one or more prompts. In certain embodiments, the data repository 103 is configured as a pre-stored voice dialog for audio signals. In an embodiment, the data repository 103 can be configured separate from the voice system 102 and/or can be in communication with the voice system 102. In an alternate embodiment, the data repository 103 can be integrated into the voice system 102. In certain embodiments, at least a portion of the memory 112 can be allocated for the data repository 103. In certain embodiments, the data repository 103 can be a cache memory for the voice system 102.

A prompt can be related to one or more workflow tasks. For example, a prompt can be related to warehouse workflows and/or warehouse workflow tasks. In one or more embodiments, a prompt can include task data related to instructions, training information, scheduling, and/or other information for one or more workflow tasks. In one or more embodiments, a prompt can be configured as text, a waveform, a signal, a hash, or another type of data format. Additionally, text data corresponding to a prompt can be converted into a digital audio signal by a text-to-speech process.

In one or more embodiments, the audio signal generation component 104 can generate a candidate audio signal for a predicted prompt to be presented via a user audio device. For example, the candidate audio signal can correspond to a predicted next prompt to be presented via the user audio device based on an expected audio response provided by the user audio device. The predicted prompt can be configured as text, a waveform, a signal, a hash, or another type of data format. The expected audio response can include expected audio data (e.g., expected voice data) such as for example, one or more words or phrases that are expected to be provided by the user audio device based on one or more previous prompts provided to the user. Accordingly, the candidate audio signal can be pre-generated for the predicted next voice prompt. The user audio device can be integrated with a mobile device, a smartphone, a wearable device, a tablet device, an augmented realty device, a virtual reality device, headphones, earphones, earbuds, and/or other type of user audio device. In a non-limiting embodiment, the user audio device is a headset device. In various embodiments, the user audio device includes one or more microphones to capture one or more audio responses and/or one or more speakers to provide one or more audio signals associated with one or more prompts. Additionally or alternatively, in certain embodiments, the user audio device includes a display to capture data associated with responses and/or to present data associated with prompts.

In various embodiments, the audio signal generation component 104 can generate the candidate audio signal and/or the predicted prompt based on historical data associated with one or more historical prompts provided to the user audio device. For example, the historical data can be related to historical audio data, historical voice data, one or more historical workflow tasks, historical instructions, historical training information, historical scheduling, and/or other historical information related to one or more historical prompt. Additionally or alternatively, the audio signal generation component 104 can generate the candidate audio signal and/or the predicted prompt based on a set of predefined prompts. A predefined prompt can include predefined data and can be related to one or more predefined workflow tasks, predefined instructions, predefined training information, predefined scheduling, and/or other predefined information. The audio signal generation component 104 can additionally or alternatively generate the candidate audio signal and/or select a predefined prompt for the candidate audio signal based on context data associated with one or more previously generated prompts for the user audio device or one or more other user audio devices. The context data can include, for example, contextual information associated with relationships, inferences, classification, patterns, and/or other context for data included in the one or more previously generated prompts. Additionally or alternatively, the context data can include location information and/or user profile information associated with the user audio device or one or more other user audio devices related to one or more previously generated prompts.

In various embodiments, the audio signal generation component 104 can employ a predetermined prompt expression to generate a prompt and/or a candidate audio signal. The predetermined prompt expression can refer to and/or use a set of variables that contain the context data. Accordingly, to determine a prompt, the audio signal generation component 104 can evaluate a prompt expression to provide the prompt. In various embodiments, the audio signal generation component 104 can then compare the prompt to cached prompts. Accordingly, in various embodiments, the audio signal generation component 104 can generate the candidate audio signal and/or the predicted prompt based on a set of predefined prompt expressions.

In response to audio response data 114 provided by the user audio device, the prompt selection component 106 can compare the predicted prompt to a prompt associated with the audio response data 114. For example, the prompt selection component 106 can compare the expected audio response with the actual recognized audio response to determine whether to transmit the candidate audio signal to the user audio device or to discard the candidate audio signal. The audio response data 114 can include audio data (e.g., voice data) associated with one or more responses to one or more prompts. The one or more prompts can be presented via the user audio device as respective audio signals, for example.

In response to a determination that the predicted prompt matches the prompt associated with the audio response data 114, the prompt audio signal component 108 can generate audio signal data 116 associated with the candidate audio signal. For example, in response to a determination that the candidate audio signal matches the audio signal, the prompt audio signal component 108 can present audio associated with the candidate audio signal via the user audio device. However, in response to a determination that the predicted prompt does not match the prompt, the prompt audio signal component 108 can discard the candidate audio signal and/or the audio signal generation component 104 can generate a new audio signal based on the audio response data 114.

In certain embodiments, the audio signal generation component 104 can generate multiple candidate audio signals for multiple prompts. Furthermore, based on the audio response data 114 provided by the user audio device, the prompt selection component 106 can select the candidate audio signal from the multiple candidate audio signals. In certain embodiments, based on selection of the candidate audio signal from the multiple candidate audio signals, the prompt selection component 106 can discard one or more other candidate audio signals from the multiple candidate audio signals. The audio signal generation component 104 can generate the multiple candidate audio signals based on historical data associated with one or more historical prompts. Additionally or alternatively, the audio signal generation component 104 can generate the multiple candidate audio signals based on a set of predefined prompts and/or a set of predefined prompt expressions. In certain embodiments, the audio signal generation component 104 can generate the multiple candidate audio signals based on context data associated with one or more previously generated prompts for the user audio device or one or more other user audio devices.

Figure 2:
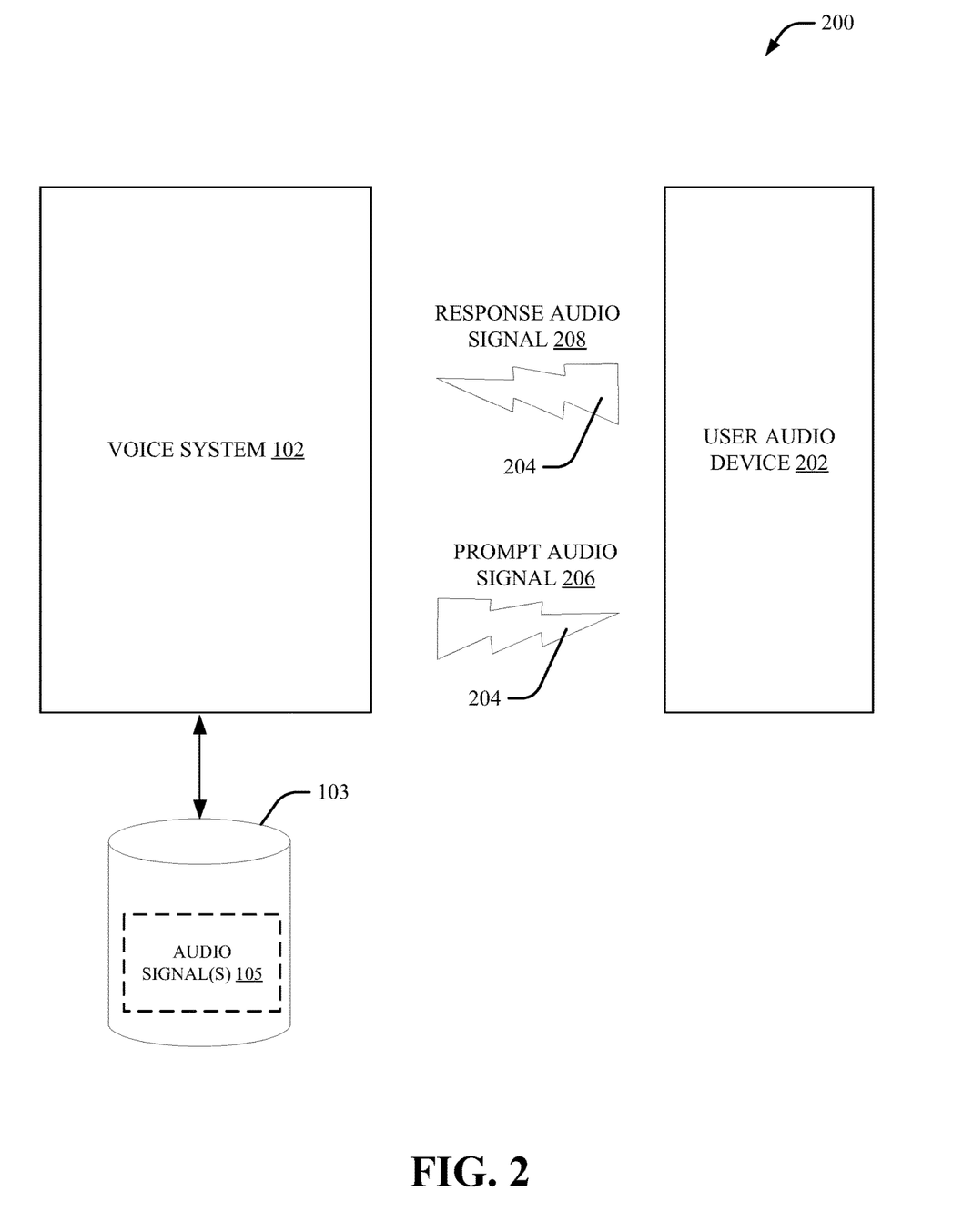
FIG. 2 illustrates an exemplary system that includes a voice system and a user audio device, in accordance with one or more embodiments described herein.

FIG. 2 illustrates an exemplary embodiment of a system 200 within which one or more described features of one or more embodiments of the disclosure can be implemented. The system 200 includes the voice system 102, the data repository 103, and a user audio device 202. The voice system 102 can be integrated with and/or can correspond to a mobile device, a smartphone, a wearable device, a tablet device, a personal computer, a server, an augmented realty device, a virtual reality device, and/or other type of computing device. In one or more embodiments, the user audio device 202 can be a wearable device. For example, in one or more embodiments, the user audio device 202 can be a headset device, headphones, earphones, or earbuds. In an embodiment, the voice system 102 can be integrated within a device separate from the user audio device 202. In another embodiment, both the voice system 102 and the user audio device 202 can be integrated within a mobile device, a smartphone, a wearable device, a tablet device, a personal computer, a server, an augmented realty device, a virtual reality device, headphones, earphones, earbuds, and/or other type of device.

The user audio device 202 can be an audio input/output (I/O) device. In various embodiments, the user audio device 202 includes one or more microphones to capture one or more audio responses from a user and/or one or more speakers to provide one or more audio signals associated with one or more prompts. For example, the user audio device 202 can be configured with headphones, earpieces, earbuds, etc. that is worn on the head of a user (e.g., a worker) to present (e.g., play) one or more voice prompts and/or voice commands to the user. Additionally, the user audio device 202 can be configured with one or more microphones for generating voice responses to voice prompts and/or voice commands. Additionally or alternatively, in certain embodiments, the user audio device 202 includes a display to capture data associated with responses and/or to present data associated with prompts. In an embodiment, one or more microphones to capture one or more audio responses from a user and one or more speakers to provide one or more audio signals associated with one or more prompts can be implemented on a corresponding device (e.g., the user audio device 202). In another embodiment, one or more microphones to capture one or more audio responses from a user and one or more speakers to provide one or more audio signals associated with one or more prompts can be implemented on separate devices.

In various embodiments, the user audio device 202 can be configured with a voice-directed mobile terminal associated with a workflow management system. For example, the user audio device 202 can be configured as a voice-driven device associated with one or more speech interfaces to permit a user to communicate (e.g., using speech or voice) with the voice system 102. In various embodiments, the voice system 102 can be a server system or can be integrated within a server system. In certain embodiments, the user audio device 202 can be configured with speech-recognition technology to permit a user to communicate (e.g., using speech or voice) with the voice system 102.

In various embodiments, the user audio device 202 can communicate with the voice system 102 via one or more communication channels 204. The one or more communication channels 204 can be one or more wired communication channels or one or more wireless communication channels. In certain embodiments, the one or more communication channels 204 can be a wired analog communication channel. In certain embodiments, the one or more communication channels 204 can be configured using Bluetooth, Near Field Communication (NFC), or any other type of communication protocol. In certain embodiments, the one or more communication channels 204 can be integrated within a mobile device, a smartphone, a wearable device, a tablet device, a personal computer, a server, an augmented realty device, a virtual reality device, headphones, earphones, earbuds, and/or other type of computing device.

In one or more embodiments, the voice system 102 can provide a prompt audio signal 206 to the user audio device 202 via a communication channel 204. The prompt audio signal 206 can be associated with a prompt for a workflow task such as, for example, a warehouse workflow task. In various embodiments, the prompt audio signal 206 can be a single prompt audio signal from a series of prompt audio signals provided by the voice system 102. In certain embodiments, the prompt audio signal 206 can corresponds to a candidate audio signal selected from the set of audio signals 105 stored in the data repository 103. For example, in response to a determination that the prompt audio signal 206 matches a response audio signal 208 provided by the user audio device 202, the voice system 102 can transmit the prompt audio signal 206 to the user audio device 202. In various embodiments, the response audio signal 208 can correspond to at least a portion of the audio response data 114. The response audio signal 208 can also be transmitted to the voice system 102 via a communication channel 204. Additionally, in various embodiments, the prompt audio signal 206 can correspond to at least a portion of the audio signal data 116.

In various embodiments, the prompt audio signal 206 can be stored in one or more data buffers as audio data to be heard by a user via the user audio device 202. In certain embodiments, the prompt audio signal 206 can be configured as an audio file to be heard by a user via the user audio device 202. Additionally, the response audio signal 208 can be stored in one or more data buffers and can includes voice data (e.g., speech data) provided by a user via the user audio device 202. For example, a user can execute one or more tasks associated with the prompt audio signal 206 (e.g., the user can go to a designated location and picks a designated product or performs some other task). In certain embodiments, the response audio signal 208 can be stored as a data file. Additionally, the user can provide audio content (e.g., a verification of a location and/or a product) and the user audio device 202 can convert the audio content into a particular data format (e.g., the response audio signal 208) to be transmitted to the voice system 102. Accordingly, in a voice-directed or speech directed work context, a speech dialog (e.g., a workflow dialog) between the user audio device 202 and the voice system 102 can be provided to facilitate execution and/or completion of one or more tasks (e.g., one or more workflow tasks).

Figure 3:
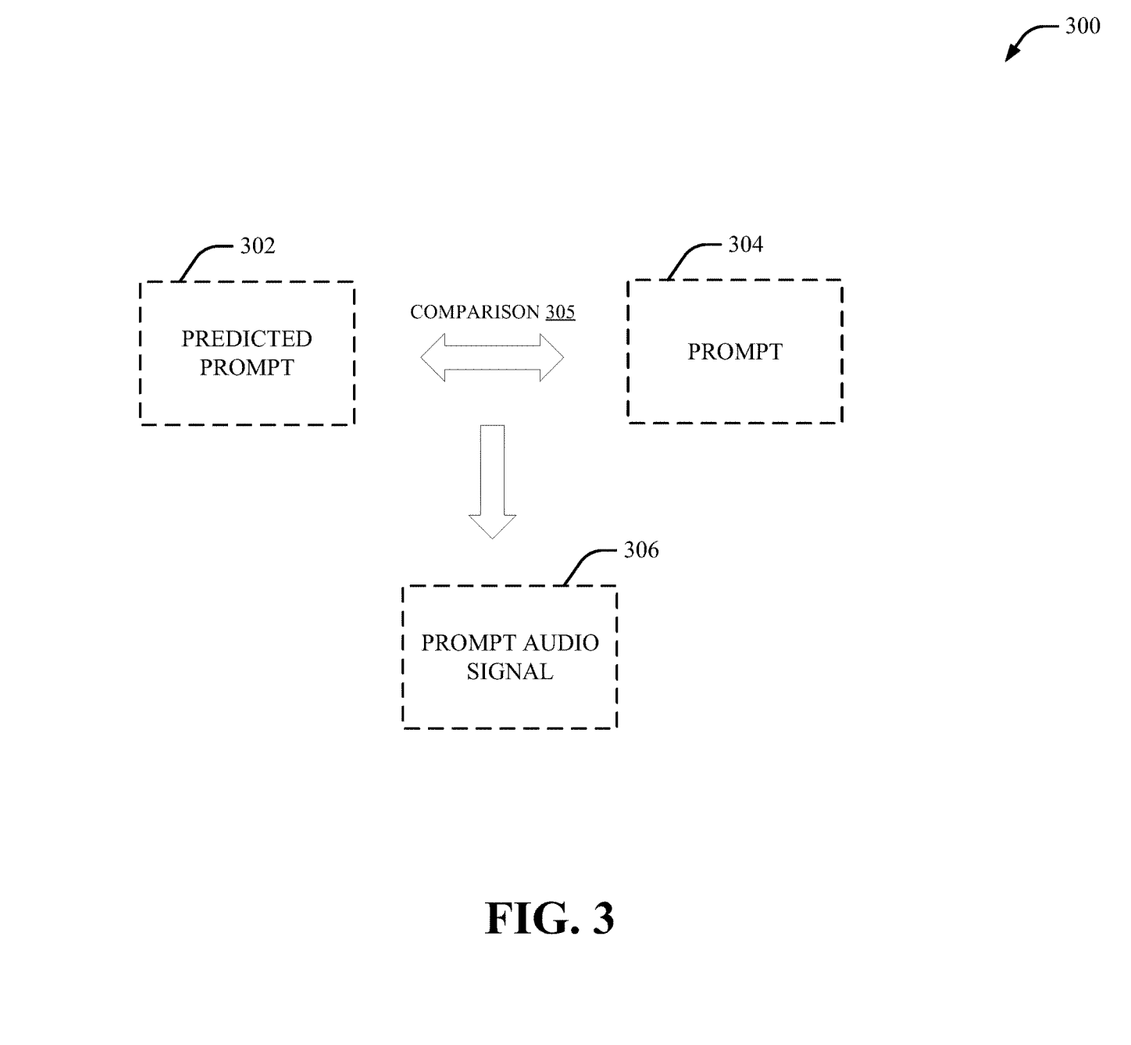
FIG. 3 illustrates a system related to determining a prompt audio signal to be presented via a user audio device, in accordance with one or more embodiments described herein.

FIG. 3 illustrates an exemplary system 300 associated with one or more features of one or more embodiments of the disclosure. The system 300 includes a predicted prompt 302 and a prompt 304. The predicted prompt 302 can include predicted text data to be converted into a candidate audio signal generated by the audio signal generation component 104. For example, the predicted prompt 302 can correspond to a predicted next prompt to be transmitted to the user audio device 202 based on an expected audio response provided by the user audio device 202. In various embodiments, the predicted prompt 302 can be generated based on historical data associated with one or more historical prompts provided to the user audio device 202. Additionally or alternatively, the predicted prompt 302 can be generated based on a set of predefined prompts and/or a set of predefined prompt expressions defined by the voice system 102. The predicted prompt 302 can additionally or alternatively be generated based on external data such as, for example, context data associated with one or more previously generated prompts for the user audio device 202.

The prompt 304 can be associated with the audio response data 114. In one or more embodiments, the prompt selection component 106 can perform a comparison 305 between the predicted prompt 302 and the prompt 304 to determine whether text (e.g., textual content) for the predicted prompt 302 matches text (e.g., textual content) for the prompt 304. In an aspect, the comparison 305 perform one or more text similarity processes to compare text included in the predicted prompt 302 to text included in the prompt 304. In certain embodiments, the comparison 305 can additionally or alternatively include a distance measure between the predicted prompt 302 and the prompt 304.

Based on the comparison 305, a prompt audio signal 306 can be determined. The prompt audio signal 306 can be provided to the user audio device 202 in response to a prompt audio signal (e.g., the prompt audio signal 206). For example, in certain embodiments, the prompt audio signal 306 can correspond to the prompt audio signal 206. In an embodiment where the comparison 305 determines that the predicted prompt 302 matches the prompt 304, the prompt audio signal 306 can be the candidate audio signal corresponding to the predicted prompt 302. However, in another embodiment where the comparison 305 determines that the predicted prompt 302 does not match the prompt 304, the prompt audio signal 306 can be a new audio signal generated based on content (e.g., content for a response) corresponding to the prompt 304.

Figure 4:
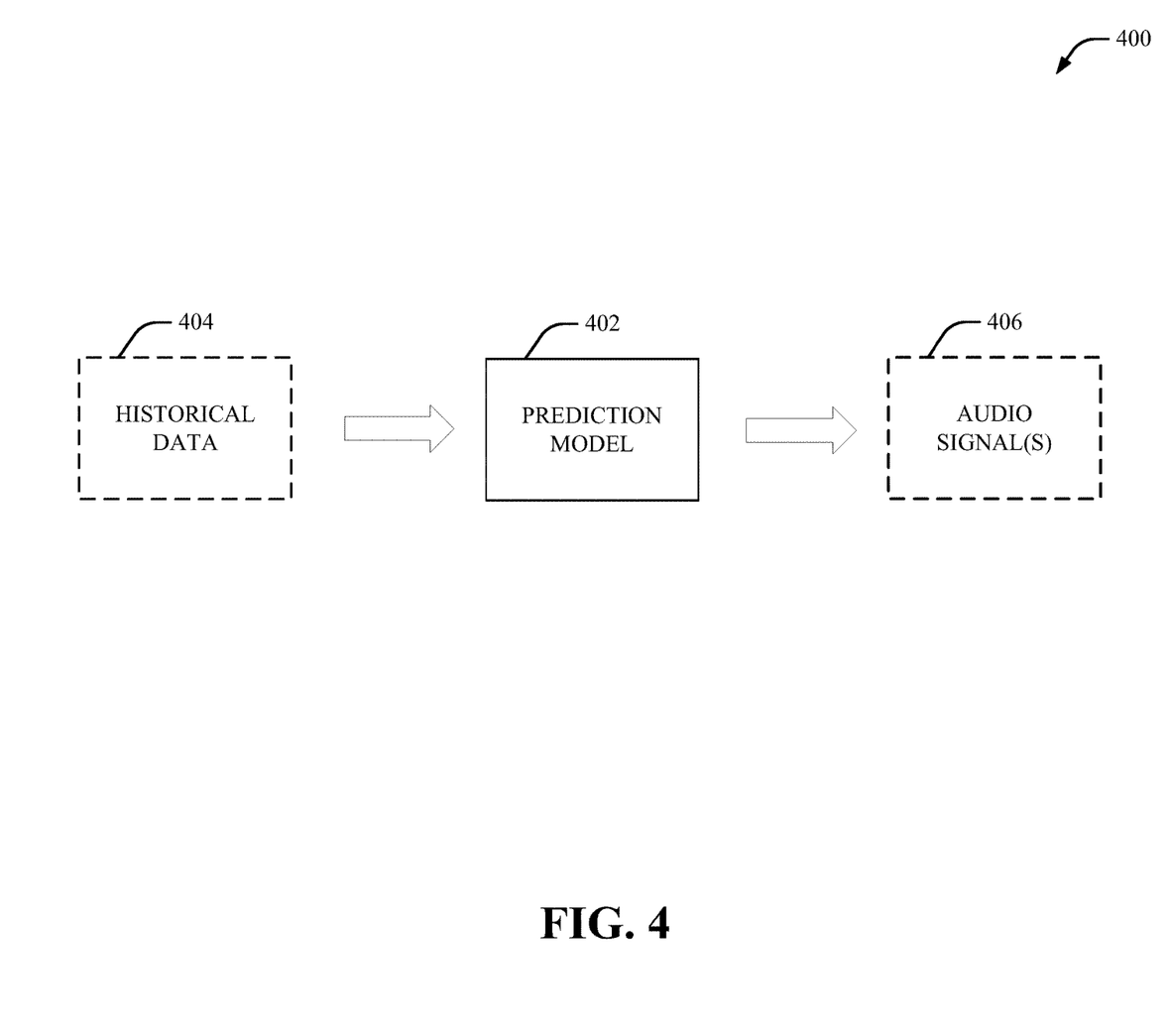
FIG. 4 illustrates a system related to predicting candidate audio signal, in accordance with one or more embodiments described herein.

FIG. 4 illustrates an exemplary system 400 associated with one or more features of one or more embodiments of the disclosure. The system 400 includes a prediction model 402. The prediction model 402 can be configured to predict one or more audio signals 406 based on historical data 404. For example, the prediction model 402 can be a machine learning model that is trained to pre-generate data associated with the one or more audio signals 406 for a list of one or more predicted next prompts for the user audio device 202. In various embodiments, the prediction model 402 can be configured as a classification model, a clustering model, a deep learning model, a neural network model (e.g., a deep neural network model, a convolutional neural network model, etc.), or another type of predictive model. The historical data 404 can include data, features, and/or attributes associated with one or more previously generated prompts for the user audio device 202 and/or one or more other user audio devices. Additionally or alternatively, the historical data 404 can include data, features, and/or attributes associated with one or more previously generated audio responses provided by the user audio device 202 and/or one or more other user audio devices. In various embodiments, at least a portion of the set of audio signals 105 can be related to the one or more audio signals 406.

Figure 5:
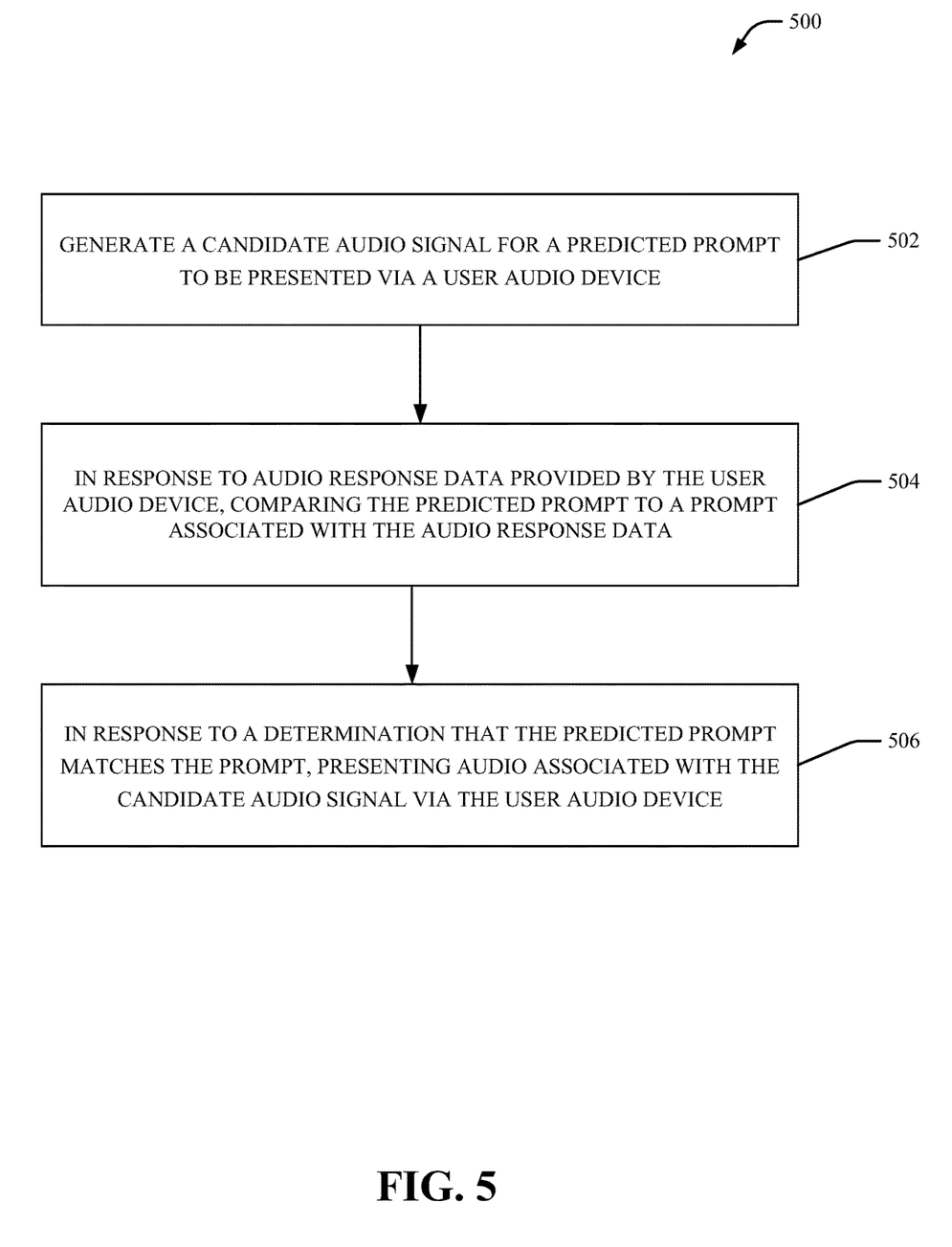
FIG. 5 illustrates a flow diagram for determining an audio signal for presentation via a user audio device, in accordance with one or more embodiments described herein.

FIG. 5 illustrates a computer-implemented method 500 for determining an audio signal for transmission to a user audio device in accordance with one or more embodiments described herein. In one or more embodiments, the computer-implemented method 500 can be executed by the voice system 102. In one or more embodiments, the computer-implemented method 500 begins at step 502 for generating a candidate audio signal for a predicted prompt to be presented via a user audio device. The computer-implemented method 500 also includes a step 504 for, in response to audio response data provided by the user audio device, comparing the predicted prompt to a prompt associated with the audio response data. The computer-implemented method 500 also includes a step 506 for, in response to a determination that the predicted prompt matches the prompt, presenting audio associated with the candidate audio signal via the user audio device.

Figure 6:
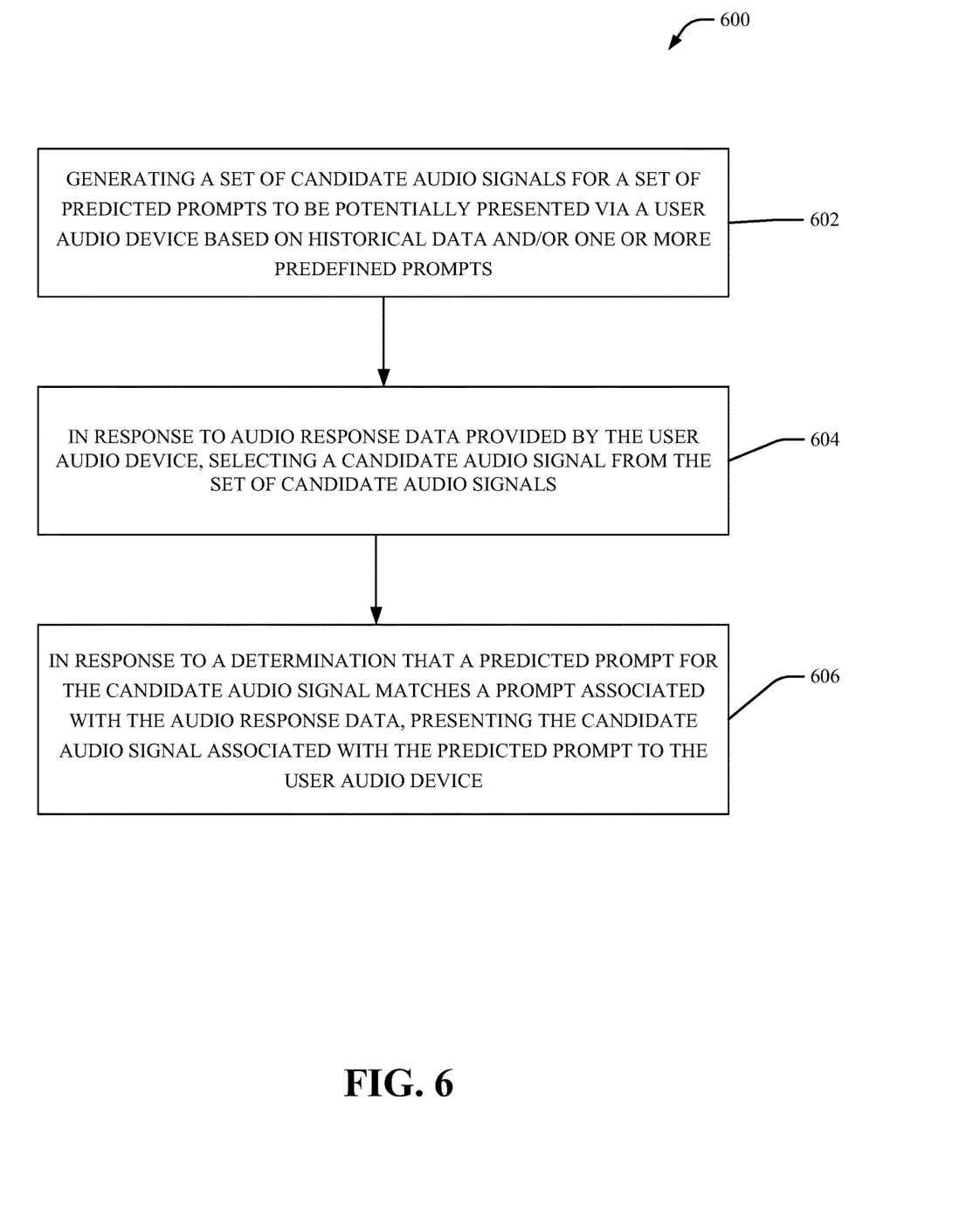
FIG. 6 illustrates another flow diagram for pre-generating candidate audio signal for presentation via a user audio device, in accordance with one or more embodiments described herein.

FIG. 6 illustrates a computer-implemented method 600 for pre-generating candidate audio signals for transmission to a user audio device in accordance with one or more embodiments described herein. In one or more embodiments, the computer-implemented method 600 can be executed by the voice system 102. In one or more embodiments, the computer-implemented method 600 begins at step 602 for generating a set of candidate audio signal for a set of predicted prompts to be potentially presented via a user audio device based on historical data and/or one or more predefined prompts. The computer-implemented method 600 also includes a step 604 for, in response to audio response data provided by the user audio device, selecting a candidate audio signal from the set of candidate audio signals. The computer-implemented method 600 also includes a step 606 for, in response to a determination that a predicted prompt for the candidate audio signal matches a prompt associated with the audio response data, presenting the candidate audio signal associated with the predicted prompt to the user audio device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system, comprising:
a processor; and
a memory that stores executable instructions that, when executed by the processor, cause the processor to:
generate multiple predicted prompts based on one or more previous prompts presented to a user audio device;
generate multiple candidate audio signals for the multiple predicted prompts to be presented via the user audio device, wherein the multiple candidate audio signals are generated based on a set of predefined prompt expressions;
compare audio response data for a previous prompt with expected audio response data for the previous prompt;
in response to determining that the audio response data matches the expected audio response data, select a candidate audio signal from the multiple candidate audio signals via the user audio device; and
based on selection of the candidate audio signal from the multiple candidate audio signals, discard one or more other candidate audio signals from the multiple candidate audio signals.

2. The system of claim 1, wherein the executable instructions further cause the processor to:
generate the multiple candidate audio signals based on historical data associated with the one or more previous prompts.

3. The system of claim 1, wherein the executable instructions further cause the processor to:
generate the multiple candidate audio signals based on a set of predefined prompts.

4. The system of claim 1, wherein the executable instructions further cause the processor to:
generate the multiple candidate audio signals based on context data associated with a previously generated prompt for the user audio device.

5. The system of claim 1, wherein the executable instructions further cause the processor to:
in response to determining that the audio response data does not match the expected audio response data, discard the multiple candidate audio signals and generate a new audio signal based on the audio response data.

6. The system of claim 1, wherein the user audio device is a wearable device.

7. The system of claim 1, wherein the user audio device is a headset device.

8. A method, comprising:
generating multiple predicted prompts based on one or more previous prompts presented to a user audio device;
generating multiple candidate audio signals for the multiple predicted prompts to be presented via the user audio device, wherein the multiple candidate audio signals are generated based on a set of predefined prompt expressions;
comparing audio response data for a previous prompt with expected audio response data for the previous prompt;
in response to determining that the audio response data matches the expected audio response data, selecting a candidate audio signal from the multiple candidate audio signals via the user audio device; and
based on selection of the candidate audio signal from the multiple candidate audio signals, discarding one or more other candidate audio signals from the multiple candidate audio signals.

9. The method of claim 8, further comprising:
generating the multiple candidate audio signals based on historical data associated with the one or more previous prompts.

10. The method of claim 8, further comprising:
generating the multiple candidate audio signals based on a set of predefined prompt expressions.

11. The method of claim 8, further comprising:
generating the multiple candidate audio signals based on context data associated with a previously generated prompt for the user audio device.

12. A computer program product comprising at least one non-transitory computer-readable storage medium having program instructions embodied thereon, the program instructions executable by a processor to cause the processor to:
generate multiple predicted prompts based on one or more previous prompts presented to a user audio device;
generate multiple candidate audio signals for the multiple predicted prompts to be presented via the user audio device, wherein the multiple candidate audio signals are generated based on a set of predefined prompt expressions;
compare audio response data for a previous prompt with expected audio response data for the previous prompt;
in response to determining that the audio response data matches the expected audio response data, select a candidate audio signal from the multiple candidate audio signals via the user audio device; and
based on selection of the candidate audio signal from the multiple candidate audio signals, discard one or more other candidate audio signals from the multiple candidate audio signals.

\* \* \* \* \*